UNITED STATES PATENT OFFICE.

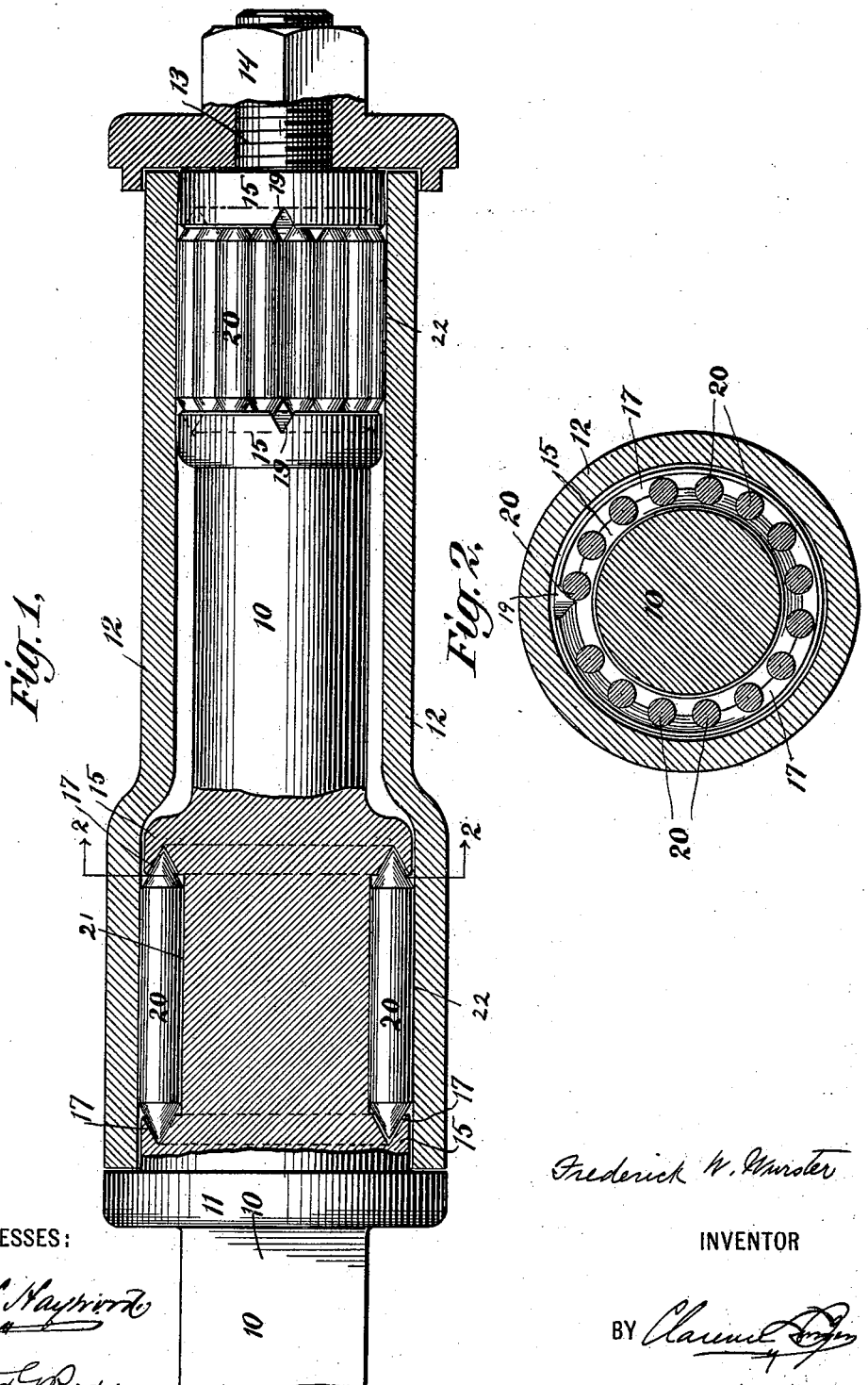

FREDERICK W. WURSTER, OF NEW YORK, N. Y.

ROLLER-BEARING.

SPECIFICATION forming part of Letters Patent No. 618,633, dated January 31, 1899.

Application filed November 16, 1898. Serial No. 696,593. (No model.)

*To all whom it may concern:*

Be it known that I, FREDERICK W. WURSTER, a citizen of the United States, residing in the borough of Brooklyn, city of New York, county of Kings, and State of New York, have invented a new and useful Improvement in Roller-Bearing Axles; and I do hereby declare that the following is a full, clear, and exact description of the same.

My invention relates to the kind of vehicle-axles in which rollers are interposed between bearings on the axle-spindle and the axle-box to lessen the friction due to the relative rotation of the spindle and box.

The objects of my invention are to simplify, cheapen, and otherwise improve the manufacture of this style of axles, to render them stronger and more durable, and to facilitate the removal and replacement of the antifriction-rollers. I accomplish these ends by forming the axle-spindle with integral pairs of collars formed with concentric grooves in their opposing sides, in which are retained the ends of antifriction-rollers running between the axle spindle and box bearings, the ends of the rollers being receivable into said grooves through slots leading from the peripheries of the collars into said grooves. I prefer to make said grooves, and hence said receiving-slots, V-shaped and the ends of the rollers also V-shaped, so as to lessen the friction, compensate for wear, and to simplify and strengthen the construction.

In order that my invention may be clearly understood, I shall first describe in detail the mode in which I carry the invention into practice and then particularly point out the invention in the claims.

Reference is to be had to the accompanying drawings, forming part of this specification, in which like parts are designated by the same numbers in both figures.

Figure 1 is a sectional plan view of one arm of a roller-bearing axle embodying my invention. Fig. 2 is a cross-sectional view of the same on the line 2 2, Fig. 1.

The axle-spindle 10, here shown, is formed with the usual collar 11, against which the inner end of the axle-box 12 turns, and with the usual threaded outer end 13, on which the flanged axle-nut 14 is screwed to retain the outer end of the box 12. I form the axle-spindle 10 with, in this instance, two pairs of integral collars 15 and by suitable means cut in their opposing sides corresponding and concentric grooves 17, preferably V-shaped in cross-section. Preferably in the tops of said collars 15 I cut correspondingly V-shaped slots 19, leading from the peripheries of said collars into the grooves 17, and through said slots I introduce (while the box is removed) into the grooves 17 the V-shaped ends of hardened antifriction-rollers 20, in number by preference completely to surround the cylindrical bearings 21 of the axle-spindle. Then when the axle-box 12 is placed in position the construction is such that the rollers 20 will run freely around between the spindle-bearings 21 and the internal bearings 22 of the axle-box 12, while the box itself will be just out of contact with the collars 15, and the V-shaped ends of the rollers will run around loosely in, while retained by, the V-shaped grooves 17. The axle-box 12 and the wheel fixed thereon will thus revolve with a minimum amount of friction around the axle-spindle, and when the box is removed the rollers will all be retained in place in the grooves 17, while capable of being easily removed by simply bringing them successively beneath the entry-slots 19 and lifting them out therethrough. The exceeding simplicity, strength, and durability of this construction is apparent at a glance, and by it the cost of manufacture of axles of this kind is reduced to a minimum.

As shown in the drawings, I make the end cylindrical axle-bearing 21, the end pair of collars 15, the end circle of rollers 20, and the cylindrical end portion of the axle-box 12 all of considerably less diameter than the inner cylindrical bearing 21, inner collars 15, inner circle of rollers 20, and inner cylindrical portion of the axle-box 12, the reduced diameter of the axle-box being continued inward to the inner circle of rollers 20, where the axle-box is enlarged, both interiorly and exteriorly, to accommodate the same. By this construction and arrangement it is evident that I gain strength and rigidity by the large diameters of the parts at the inner end of the axle-arm, and by the reduced diameters of the parts outside the inner rollers provide for an extra thickness and consequent increased strength of the hub where the spokes are inserted therein, while at the same time using truly cylindrical bearings and rollers throughout instead of the very expensive and in this art impractical conical or tapered bearings and rollers. Further, the unoccupied annular space left by my construction between the inner and outer pairs of collars 15 forms, as is evident, a capacious oil-reservoir in open communication with both the inner and outer sets of rollers and bearings, whereby perfect lubrication may be attained for an exceptionally long period with one filling.

Having thus described my invention, I claim—

1. In an axle, an axle-spindle formed integrally with a pair of small collars and a small intermediate cylindrical bearing at its outer end and with a larger pair of collars and a larger intermediate cylindrical bearing at its inner end, the collars of each pair having concentric grooves in their opposing faces, in combination with small and larger circles of cylindrical antifriction-rollers to run around said outer and inner cylindrical axle-bearings respectively, and having their ends retained in said grooves, and an axle-box to run around said inner and outer circles of rollers and having its outer portion reduced in internal and external diameter.

2. In an axle, an axle-spindle formed integrally at both its inner and its outer ends with a pair of collars and a cylindrical bearing therebetween, the collars of each pair having concentric grooves in their opposing faces, in combination with circles of cylindrical antifriction-rollers to run around said inner and outer cylindrical bearings and having their ends retained in said grooves, and an axle-box having cylindrical internal bearings to run around said inner and outer circles of rollers, the annular space between the axle-box and spindle and between the inner and outer pairs of collars forming an oil-reservoir in open communication with both sets of collars.

In testimony whereof I have hereunto set my hand the 27th day of October, 1898.

FREDERICK W. WURSTER.

In presence of—
JOHN HOFFMANN,
WILLIAM O. FITCH.